United States Patent
Blizanac et al.

(10) Patent No.: US 10,135,071 B2
(45) Date of Patent: Nov. 20, 2018

(54) CONDUCTIVE CARBONS FOR LITHIUM ION BATTERIES

(71) Applicant: Cabot Corporation, Boston, MA (US)

(72) Inventors: Berislav Blizanac, Acton, MA (US); Aurelien L. DuPasquier, Westford, MA (US); Miodrag Oljaca, Concord, MA (US)

(73) Assignee: Cabot Corporation, Boston, MA (US)

( * ) Notice: Subject to any disclaimer, the term of this patent is extended or adjusted under 35 U.S.C. 154(b) by 327 days.

(21) Appl. No.: 14/895,994

(22) PCT Filed: Jun. 19, 2014

(86) PCT No.: PCT/US2014/043177
§ 371 (c)(1),
(2) Date: Dec. 4, 2015

(87) PCT Pub. No.: WO2014/205211
PCT Pub. Date: Dec. 24, 2014

(65) Prior Publication Data
US 2016/0118667 A1    Apr. 28, 2016

Related U.S. Application Data

(60) Provisional application No. 61/837,966, filed on Jun. 21, 2013.

(51) Int. Cl.
*H01M 4/62* (2006.01)
*H01M 4/525* (2010.01)
(Continued)

(52) U.S. Cl.
CPC ......... *H01M 4/625* (2013.01); *H01M 4/0402* (2013.01); *H01M 4/131* (2013.01);
(Continued)

(58) Field of Classification Search
CPC combination set(s) only.
See application file for complete search history.

(56) References Cited

U.S. PATENT DOCUMENTS

2002/0047112 A1    4/2002  Hosoya et al.
2002/0172867 A1*  11/2002  Anglin ............... H01M 4/06
                                             429/232
(Continued)

FOREIGN PATENT DOCUMENTS

JP    H 06275277 A    9/1994
JP    H 07296794 A    11/1995
(Continued)

OTHER PUBLICATIONS

International Search Report and the Written Opinion of the International Searching Authority, or the Declaration of International Application No. PCT/US2014/043177, dated Oct. 7, 2014.

*Primary Examiner* — Eugenia Wang

(57) ABSTRACT

Disclosed herein are cathode formulations comprising a lithium ion-based electroactive material and a carbon black having a BET surface area ranging from 130 to 700 $m^2/g$ and a ratio of STSA/BET ranging from 0.5 to 1. Also disclosed are cathodes comprising the cathode formulations, electrochemical cells comprising the cathodes, and methods of making the cathode formulations and cathodes.

14 Claims, 7 Drawing Sheets

(51) Int. Cl.
    *H01M 4/505*   (2010.01)
    *H01M 4/04*    (2006.01)
    *H01M 4/58*    (2010.01)
    *H01M 4/1391*  (2010.01)
    *H01M 4/131*   (2010.01)
    *H01M 4/136*   (2010.01)
    *H01M 4/1397*  (2010.01)
    *H01M 4/02*    (2006.01)

(52) U.S. Cl.
    CPC ......... *H01M 4/136* (2013.01); *H01M 4/1391* (2013.01); *H01M 4/1397* (2013.01); *H01M 4/505* (2013.01); *H01M 4/525* (2013.01); *H01M 4/5825* (2013.01); *H01M 2004/028* (2013.01)

(56) References Cited

U.S. PATENT DOCUMENTS

| | | |
|---|---|---|
| 2002/0189498 A1 | 12/2002 | Nguyen et al. |
| 2003/0017379 A1 | 1/2003 | Menashi |
| 2003/0049535 A1* | 3/2003 | Ohta ............... H01M 4/133 429/231.8 |
| 2006/0068282 A1 | 3/2006 | Kishi et al. |
| 2006/0257743 A1* | 11/2006 | Kuratomi ........... H01M 4/505 429/223 |
| 2009/0208780 A1 | 8/2009 | Sun et al. |
| 2009/0305132 A1 | 12/2009 | Gauthier et al. |
| 2010/0230641 A1 | 9/2010 | Oki et al. |
| 2010/0297503 A1 | 11/2010 | Kitagawa et al. |
| 2011/0240913 A1 | 10/2011 | Kim et al. |
| 2012/0129686 A1* | 5/2012 | Querner ............ B01J 21/18 502/185 |
| 2012/0230905 A1 | 9/2012 | Karl et al. |
| 2013/0130113 A1 | 5/2013 | Takano et al. |
| 2014/0227601 A1* | 8/2014 | Azami ............... H01M 4/133 429/231.8 |

FOREIGN PATENT DOCUMENTS

| | | | |
|---|---|---|---|
| JP | 2005-285632 A | 10/2005 | |
| JP | 2013-093171 A | 5/2013 | |
| JP | 2014-241279 A | 12/2014 | |
| WO | WO-2011026581 A1 * | 3/2011 | ............ B82Y 30/00 |
| WO | WO 2013/096784 A1 | 6/2013 | |

* cited by examiner

CONDUCTIVE CARBONS FOR LITHIUM ION BATTERIES

RELATED APPLICATION

This application is a § 371 national phase application of and claims priority to PCT Application No. PCT/US2014/043177, filed Jun. 19, 2014, which claims priority under 35 U.S.C. § 119(e) to U.S. Prov. App. No. 61/837,966, filed Jun. 21, 2013, the disclosure of which is incorporated herein by reference.

FIELD OF THE INVENTION

Disclosed herein are cathode formulations comprising conductive carbons, e.g., carbon black, for use in lithium ion batteries, pastes comprising such conductive carbons, and methods for preparing the same.

BACKGROUND

In lithium ion batteries, the electrode layers typically exhibit relatively high resistivity either due to the limited number of point contacts between micron sized particles of the active phase and/or due to the intrinsically poor electronic conductivity of the active phase itself (common for cathode materials). The electrodes further comprise binders (e.g., PVDF), which insure mechanical integrity and stability of the electrode layer, but which are electric insulators that can further reduce the electrical conductivity of such layers. To minimize the problem of poor electrical conductivity of the electrode layer, conductive powders such as carbon black and graphite powders are added to the electrode formulation. These conductive powders decrease the electrical resistivity of the electrode mass but generally are not involved in the electrode reactions responsible for generating energy of the electrochemical cell. As a result, carbon conductive additives can function as conductive diluents that can have a negative impact on the energy density of a battery.

Accordingly, there remains a need for continued development of new cathode formulations.

SUMMARY

One embodiment provides a cathode formulation comprising:
a lithium ion-based electroactive material; and
carbon black having a BET surface area ranging from 130 to 700 $m^2/g$ and a ratio of STSA/BET ranging from 0.5 to 1.

Another embodiment provides a cathode paste containing particles comprising a lithium ion-based electroactive material and a carbon black, wherein the paste further comprises:
a binder; and
a solvent,
wherein the carbon black has a BET surface area ranging from 130 to 700 $m^2/g$ and a ratio of STSA/BET ranging from 0.5 to 1.

Another embodiment provides a method of making a cathode, comprising:
combining particles comprising carbon black, a lithium ion-based electroactive material, and a binder in the presence of a solvent to produce a paste;
depositing the paste onto a substrate; and
forming the cathode,
wherein the carbon black has a BET surface area ranging from 130 to 700 $m^2/g$ and a ratio of STSA/BET ranging from 0.5 to 1.

BRIEF DESCRIPTION OF THE DRAWING(S)

FIG. 1. is a plot of specific capacity at 5C as a function of carbon black surface area in a cathode formulation comprising 3 wt % carbon black;

FIGS. 2A-C are plots of voltage profiles at 0.2, 0.5, 1, 2, 5C discharge rates for cathodes having 3 wt. % carbon black having a surface area of (FIG. 2A) 54 $m^2/g$, (FIG. 2B) 180 $m^2/g$, and (FIG. 2C) 580 $m^2/g$;

DETAILED DESCRIPTION

Figure 1:
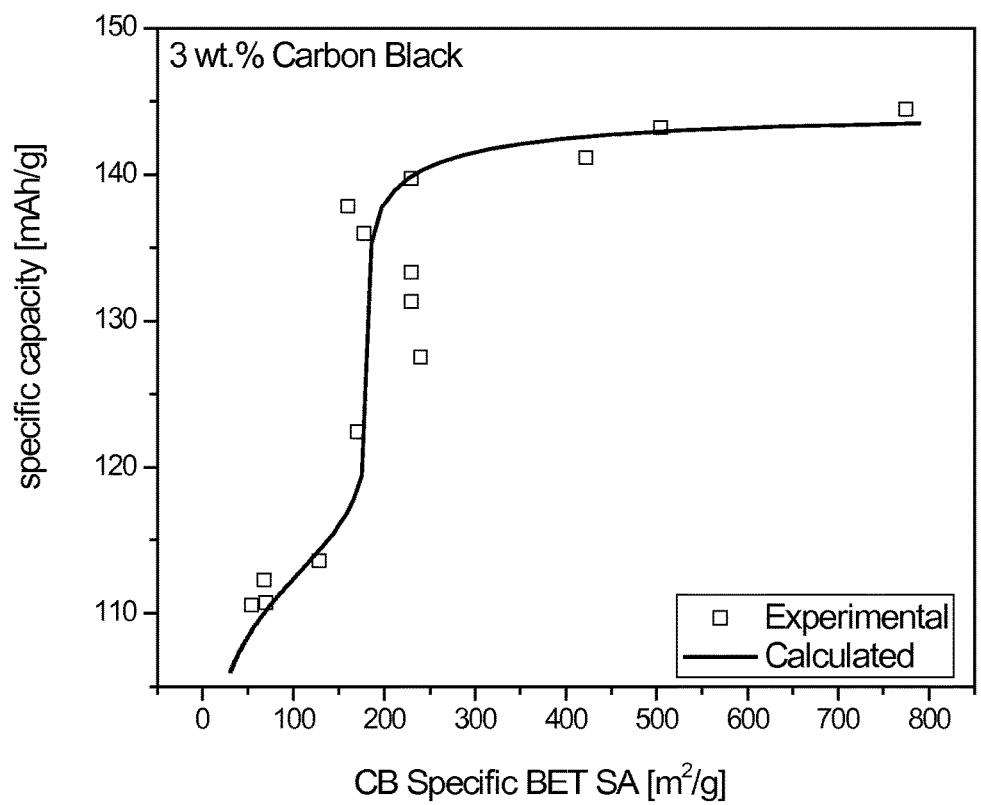

Composite cathode formulations typically contain an electroactive component, a binder, and conductive additives. While much of the development to improve the performance of lithium ion batteries centers on the electroactive and electrolyte components, a frequently neglected component of the cathode formulation is the conductive additive, with respect to improvements in chemical and electrochemical properties.

In the battery industry, there are at least two competing requirements for the amount of conductive additive needed: (i) high and uniform electrical conductivity to eliminate polarization effects, which may be heightened at high current densities (voltage loss=current density×cell resistance), requiring a high amount of conductive additive, and (ii) high energy density to enable a high amount of energy to be stored in as small a volume as possible (small weight), dictating that the amount of conductive additive (diluent) be as low as possible. These two antagonistic requirements presently result in necessary trade-offs between energy and power density.

Carbon blacks have primary particles (nodules) fused together into aggregates that could further be agglomerated. Parameters used to describe carbon blacks include surface area, structure, crystallinity, purity etc. The surface area generally corresponds to the size of the primary particles and their porosity—the higher the surface area, the smaller the primary particles and the aggregates and therefore more aggregates per unit weight. Higher aggregate count per unit weight increases the probability for contact between the carbon black particles themselves and between the carbon black particles and active materials, which can result in improved electrical conductivity of the electrode layer. Thus, high surface area of carbon black can be beneficial for the electrical properties of electrode layers.

However, high surface area comes with a penalty in many other areas, such as facilitated parasitic reactions and negative impact on cycle and calendar life. Moreover, high surface area carbon blacks may also require elevated amounts of binder (an insulator) with an accompanying decrease in the amount of the active material responsible for storing energy. During manufacturing, high surface area carbon blacks are typically more difficult to disperse and can result in increased slurry viscosity. To obtain a pastable slurry, the solids loading needs to be decreased which negatively impacts the process/manufacturing economy (solvent is expensive and never 100% recovered).

Disclosed herein are cathode formulations comprising a lithium ion-based electroactive material, and a carbon black having a BET surface area ranging from 130 to 700 m$^2$/g and a ratio of STSA/BET ranging from 0.5 to 1. STSA (statistical thickness surface area) and BET surface area can be determined according to ASTM-D6556. Without wishing to be bound by any theory, it is believed that the selection of these parameters result in conductive carbon blacks that help achieve maximum performance while maintaining a sufficiently low surface area for suitable handling during manufacturing.

Additionally, without wishing to be bound by any theory, it is believed that in this surface area range, the battery performance as measured by capacity retention at 5C discharge correlates with the surface area of the carbon black, as demonstrated by FIG. 1. FIG. 1 is a plot of specific capacity at 5C as a function of carbon black surface area in a cathode formulation comprising 3 wt % carbon black (additional experimental details are disclosed in Example 1). As can be seen in FIG. 1, the specific capacity generally increases with surface area in the surface area range of 130 to 700 m$^2$/g. The plot of FIG. 1 has the shape of a typical percolation curve in which the transition occurs in the surface area range of approximately 200-300 m$^2$/g. It can be seen that at surface area values greater than 700 m$^2$/g, the improvement in performance is negligible.

In one embodiment, the carbon black has a BET surface area ranging from 130 to 500 m$^2$/g, such as a surface area ranging from 130 to 400 m$^2$/g, from 130 to 300 m$^2$/g, from 200 to 500 m$^2$/g, from 200 to 400 m$^2$/g, or from 200 to 300 m$^2$/g.

In one embodiment, the ratio of STSA/BET ranges from 0.5 to 1, e.g., a ratio of 0.55 to 1 or a ratio of 0.6 to 1. In one embodiment, this ratio indicates a carbon black having a significantly reduced amount of porosity.

In one embodiment, the carbon black has a structure, as defined by oil adsorption number (OAN), that indicates a lesser number of imperfections via a higher degree of graphitization. OAN can be determined according to ASTM-D2414. In one embodiment, the carbon black has an OAN of less than 250 mL/100 g, e.g., an OAN ranging from 50 to 250 mL/100 g, from 100 to 250 mL/100 g, or from 100 to 200 mL/100 g.

In one embodiment, a higher degree of graphitization can be indicated by lower surface energy values, which are typically a measure of the amount of oxygen on the surface of carbon black, and thus, its hydrophobicity. Surface energy can be measured by Dynamic Water Sorption (DWS). In one embodiment, the carbon black has a surface energy (SE) less than or equal to 10 mJ/m$^2$, e.g., less than or equal to 9 mJ/m$^2$, less than or equal to 7 mJ/m$^2$, less than or equal to 6 mJ/m$^2$, less than or equal to 5 mJ/m$^2$, less than or equal to 3 mJ/m$^2$, or less than or equal to 1 mJ/m$^2$.

In one embodiment, a higher % crystallinity (obtained from Raman measurements as a ratio of D and G bands) may also indicate a higher degree of graphitization. In one embodiment, the carbon black has a % crystallinity ($I_G/I_D$) of at least 35%, as determined by Raman spectroscopy, e.g., a % crystallinity of at least 38%, or at least 40%.

In one embodiment, the carbon black has a crystallite size ($L_a$) of at least 25 Å, as determined by Raman spectroscopy, where $L_a$ is defined as 43.5×(area of G band/area of D band). The crystallite size can give an indication of the degree of graphitization where a higher $L_a$ value correlates with a higher degree of graphitization. In another embodiment, the carbon black has a crystallite size of at least 30 Å, at least 35 Å, at least 40 Å, at least 45 Å, or at least 50 Å.

The crystallite size can give an indication of the degree of graphitization where a higher $L_a$ value correlates with a higher degree of graphitization. Raman measurements of $L_a$ were based on Gruber et al., "Raman studies of heat-treated carbon blacks," Carbon Vol. 32 (7), pp. 1377-1382, 1994, which is incorporated herein by reference. The Raman spectrum of carbon includes two major "resonance" bands at about 1340 cm$^{-1}$ and 1580 cm$^{-1}$, denoted as the "D" and "G" bands, respectively. It is generally considered that the D band is attributed to disordered sp$^2$ carbon and the G band to graphitic or "ordered" sp$^2$ carbon. Using an empirical approach, the ratio of the G/D bands and the $L_a$ measured by X-ray diffraction (XRD) are highly correlated, and regression analysis gives the empirical relationship:

$$L_a = 43.5 \times (\text{area of } G \text{ band/area of } D \text{ band}),$$

in which $L_a$ is calculated in Angstroms. Thus, a higher $L_a$ value corresponds to a more ordered crystalline structure. In another embodiment, the carbon black has a crystallite size of at least 35 Å, at least 40 Å, at least 45 Å, or at least 50 Å.

In one embodiment, the carbon black is a heat-treated carbon black. "Heat treatment" of carbon black, as used herein, generally refers to a post-treatment of a carbon black that had been previously formed by methods generally known in the art, e.g., a furnace black process. The heat treatment can occurs under inert conditions (i.e., in an atmosphere substantially devoid of oxygen), and typically occurs in a vessel other than that in which the carbon black was formed. Inert conditions include, but are not limited to, an atmosphere of inert gas, such as nitrogen, argon, and the like. In one embodiment, the heat treatment of carbon blacks under inert conditions, as described herein, is capable of reducing the number of defects, dislocations, and/or discontinuities in carbon black crystallites and/or increase the degree of graphitization.

In one embodiment, the heat treatment (e.g., under inert conditions) is performed at a temperature of at least 1000° C., at least 1200° C., at least 1400° C., at least 1500° C., at least 1700° C., or at least 2000° C. In another embodiment, the heat treatment is performed at a temperature ranging from 1000° C. to 2500° C. Heat treatment "performed at a temperature" refers to one or more temperatures ranges disclosed herein, and can involve heating at a steady temperature, or heating while ramping the temperature up or down, either continuously or stepwise.

In one embodiment, the heat treatment is performed for at least 15 minutes, e.g., at least 30 minutes, at least 1 h, at least 2 h, at least 6 h, at least 24 h, or any of these time periods up to 48 h, at one or more of the temperature ranges disclosed herein. In another embodiment, the heat treatment is performed for a time period ranging from 15 minutes to at least 24 h, e.g., from 15 minutes to 6 h, from 15 minutes to 4 h, from 30 minutes to 6 h, or from 30 minutes to 4 h.

In one embodiment, the carbon black is present in the cathode formulation in an amount ranging from 0.5% to 10% by weight, e.g., and amount ranging from 1% to 10% by weight, relative to the total weight of the formulation.

In one embodiment, the electroactive material is present in the composite cathode in an amount of at least 80% by weight, relative to the total weight of the cathode formulation, e.g., an amount of at least 90%, an amount ranging from 80% to 99%, or an amount ranging from 90% to 99% by weight, relative to the total weight of the cathode formulation. The electroactive material is typically in the form of particles. In one embodiment, the particles have a $D_{50}$ ranging from 100 nm to 30 µm, e.g., a $D_{50}$ ranging from 1-15 µm. In one embodiment, the particles have a size ranging from 1-6 µm, e.g., from 1-5 µm.

In one embodiment, the electroactive material is a lithium ion-based compound. Exemplary electroactive materials include those selected from at least one of:

$LiMPO_4$, wherein M represents one or more metals selected from Fe, Mn, Co, and Ni;

$LiM'O_2$, wherein M' represents one or more metals selected from Ni, Mn, Co, Al, Mg, Ti, V, Cr, Fe, Zr, Ga, and Si;

$Li(M'')_2O_4$, wherein M'' represents one or more metals selected from Ni, Mn, Co, Al, Mg, Ti, V, Cr, Fe, Zr, Ga, and Si (e.g., $Li[Mn(M'')]_2O_4$); and $Li_{1+x}(Ni_yCo_{1-y-z}Mn_z)_{1-x}O_2$, wherein x ranges from 0 to 1, y ranges from 0 to 1 and z ranges from 0 to 1.

In one embodiment, the electroactive material is selected from at least one of $LiNiO_2$; $LiNi_xAl_yO_2$ where x varies from 0.8-0.99, y varies from 0.01-0.2, and x+y=1; $LiCoO_2$; $LiMn_2O_4$; $Li_2MnO_3$; $LiNi_{0.5}Mn_{1.5}O_4$; $LiFe_xMn_yCo_zPO_4$ where x varies from 0.01-1, y varies from 0.01-1, z varies from 0.01-0.2, and x+y+z=1; $LiNi_{1-x-y}Mn_xCo_yO_2$, wherein x ranges from 0.01 to 0.99 and y ranges from 0.01 to 0.99; and layer-layer compositions containing an $Li_2MnO_3$ phase or a $LiMn_2O_3$ phase.

In one embodiment, the electroactive material is selected from at least one of $Li_2MnO_3$; $LiNi_{1-x-y}Mn_xCo_yO_2$ wherein x ranges from 0.01 to 0.99 and y ranges from 0.01 to 0.99; $LiNi_{0.5}Mn_{1.5}O_4$; $Li_{1+x}(Ni_yCo_{1-y-z}Mn_z)_{1-x}O_2$, wherein x ranges from 0 to 1, y ranges from 0 to 1 and z ranges from 0 to 1; and layer-layer compositions containing at least one of an $Li_2MnO_3$ phase and an $LiMn_2O_3$ phase.

Cathodes are the performance limiting component in Li-ion batteries because their capacity (~160 mAh/g) does not match the anode capacity (320 mAh/g for graphite). It has been discovered that the use of certain Mn rich formulations as active materials result in cathodes having a capacity approaching 280 mAh/g, and a gravimetric energy around 900 Wh/kg. However, these materials have low charge and discharge rate capabilities, causing them to lose their energy advantage even at moderate discharge rates of 2 C. Another drawback of these materials is that they display a wide voltage swing from 4.8 to 2.0V during discharge.

Accordingly, one embodiment provides a mixture of active materials comprising: a nickel-doped Mn spinel, which has a high and flat discharge voltage around 4.5 V and a high power capability; and a layer-layer Mn rich composition, which makes it possible to increase discharge voltage and power capability. In one embodiment, the nickel-doped Mn spinel has the formula $LiNi_{0.5}Mn_{1.5}O_4$, and the layer-layer Mn rich composition contains a $Li_2MnO_3$ or a $LiMn_2O_3$ phase, and mixtures thereof.

In one embodiment, the cathode formulation further comprises a binder. Exemplary binder materials include but are not limited to fluorinated polymers such as poly(vinyldifluoroethylene) (PVDF), poly(vinyldifluoroethylene-co-hexafluoropropylene) (PVDF-HFP), poly(tetrafluoroethylene) (PTFE), polyimides, and water-soluble binders such as poly(ethylene)oxide, polyvinyl-alcohol (PVA), cellulose, carboxymethylcellulose (CMC), starch, hydroxypropylcellulose, regenerated cellulose, polyvinyl pyrrolidone (PVP), and copolymers and mixtures thereof. Other possible binders include polyethylene, polypropylene, ethylene-propylene-diene terpolymer (EPDM), sulfonated EPDM, styrene-butadiene rubber (SBR), and fluoro rubber and copolymers and mixtures thereof.

Another embodiment provides a cathode formulation comprising, consisting essentially of, or consisting of:

a lithium ion-based electroactive material; and carbon black having a BET surface area ranging from 130 to 700 $m^2/g$ and a ratio of STSA/BET ranging from 0.5 to 1.

Another embodiment provides a cathode formulation comprising, consisting essentially of, or consisting of:

a lithium ion-based electroactive material, a carbon black, and a binder, wherein the carbon black has a BET surface area ranging from 130 to 700 $m^2/g$ and a ratio of STSA/BET ranging from 0.5 to 1.

In one embodiment, the cathode formulation can take the form of a paste or slurry in which particulate electroactive material and carbon black are combined in the presence of a solvent. In another embodiment, the cathode formulation is a solid resulting from solvent removal from the paste/slurry.

In one embodiment, the formulation is a particulate cathode formulation. In one embodiment, "particulate" refers to a powder (e.g., a free-flowing powder). In one embodiment, the powder is substantially free of water or solvent, such as less than 10%, less than 5%, less than 3%, or less than 1% water or solvent.

In one embodiment, the carbon black is homogeneously interspersed (uniformly mixed) with the electroactive material, e.g., the lithium-ion based material. In another embodiment, the binder is also homogeneously interspersed with the carbon black and electroactive material.

Another embodiment method of making a cathode, comprising:

combining particles comprising carbon black, a lithium ion-based electroactive material, and a binder in the presence of a solvent to produce a paste;

depositing the paste onto a substrate; and forming the cathode, wherein the carbon black has a BET surface area ranging from 130 to 700 $m^2/g$ and a ratio of STSA/BET ranging from 0.5 to 1.

In one embodiment, the one embodiment, the paste is the product of combining particles comprising electroactive material with carbon black and binder in the presence of a solvent. In one embodiment, the paste has a sufficiently high solids loading to enable deposition onto a substrate while minimizing the formation of inherent defects (e.g., cracking) that may result with a less viscous paste (e.g., having a lower solids loading). Moreover, a higher solids loading reduces the amount of solvent needed.

The particles can be combined in the solvent in any order so long as the resulting paste is substantially homogeneous, which can be achieved by shaking, stirring, etc. The particles can be formed in situ or added as already formed particles having the domain sizes disclosed herein. "Solvent" as used herein refers to one or more solvents. Exemplary solvents include e.g., N-methylpyrrolidone, acetone, alcohols, and water.

In one embodiment, the method comprises depositing the paste onto a current collector (e.g., an aluminum sheet), followed by forming the cathode. In one embodiment, "forming the cathode" comprises removing the solvent. In one embodiment, the solvent is removed by drying the paste either at ambient temperature or under low heat conditions, e.g., temperatures ranging from 20° to 100° C. The method can further comprise cutting the deposited cathode/Al sheet to the desired dimensions, optionally followed by calendaring.

Another embodiment provides a cathode paste containing particles comprising a lithium ion-based electroactive material and a carbon black, wherein the paste further comprises:
a binder; and
a solvent,
wherein the carbon black has a BET surface area ranging from 130 to 700 m$^2$/g and a ratio of STSA/BET ranging from 0.5 to 1.

In one embodiment, the cathode paste consists essentially of, or consists of, the lithium ion-based electroactive material, the carbon black, the binder, and the solvent.

One embodiment provides a cathode comprising the cathode formulation. The cathode can further comprise a binder and a current collector. In one embodiment, the active material is a high voltage cathode with the charging cut-off voltage of 4.95 V versus Li-metal reference electrode. In one embodiment, the cathode has a thickness of at least 10 μm, e.g., a thickness of at least 30 μm. Another embodiment provides an electrochemical cell comprising the cathode, such as a lithium ion battery.

In one embodiment, an electrochemical cell comprising the disclosed cathode materials provides one or more of improved power performance in lithium ion battery cathodes, improved inertness toward carbon corrosion oxidation, and/or improved inertness toward carbon and/or electrolyte oxidation, and improved percolation behavior.

EXAMPLES

Example 1

Carbon black samples CB-A, CB-B, and CB-C were produced by heat treating the respective base carbon blacks: Vulcan® XC72 and XC500 conductive blacks, and Black Pearls® 700 carbon black, available from Cabot Corporation. All three carbon black samples were processed in a box furnace at 1200° C. under N$_2$ for 4 h. Carbon black sample CB-D was prepared by heating PBX™ 42 (Cabot Corporation) at 1400° C. under N$_2$ for 1 h. Cathode formulations were prepared with the general formula: (100-2x) wt. % active material, x wt. % PVDF, x wt. % CB, where the weight fraction x of PVDF and CCF are equal and varied from 1, 2 or 3 wt. %. The active material ("CATH") used was a powder of formula LiNi$_{0.33}$Co$_{0.33}$Mn$_{0.33}$O$_2$, and is considered a small particle size material having an average D$_{50}$=2.4 μm, prepared by reactive spray technology as described in U.S. Pat. No. 6,770,226, the disclosure of which is incorporated herein by reference. Properties of the carbon blacks used in this Example are listed in Table 1 below.

TABLE 1

| | BET SA [m$^2$/g] | STSA/ BET | OAN [ml/100 g] | % Crystallinty | L$_a$ Raman | Surface Energy |
|---|---|---|---|---|---|---|
| CB-A | 54 | 1 | 130 | 46.5 | 38.2 | |
| CB-B | 180 | 0.78 | 170 | 37.5 | 26.2 | 7.6 |
| CB-C | 160 | 1 | 110 | | 28.3 | 7 |
| CB-D | 580 | 0.69 | 150 | 39.5 | 28.4 | 8.8 |

The electrodes were prepared with ~50 wt. % solids loading in PVDF, and the slurries dispersed for 30 min in a Spex mill. Electrodes were coated on aluminum foil with an automated doctor blade coater (MTI corp.).

Electrode discs of 15 mm diameter were punched and calendared to a final porosity of ~15%, dried at 100° C. for at least 1 hour under vacuum, and transferred to an argon filled glove box for coin-cell assembly. Lithium foil (0.1 mm thick) anode, fiberglass separator and EC-DMC-EMC, VC 1 wt. %, LiPF6 1M electrolyte with less than 20 ppm water contents (Novolyte) were used.

Electrochemical testing was conducted with MTI or Maccor battery cycler, in a typical sequence consisting of C/5 charge formation, C/5 discharge, then C/2 charges and C/5, C/2, 1C, 2C, 5C discharges (or 2C maximum in the case of thick LCO electrodes due to cycler maximum current limitation). These values were generated from averages of a least 4 identical coin-cells. From the voltage versus current curves, the values of specific capacity and mid-discharge voltage versus C-rate of discharge were extracted and plotted. Obvious outliers were eliminated in some cases.

Figures 2A, 2B, 2C:
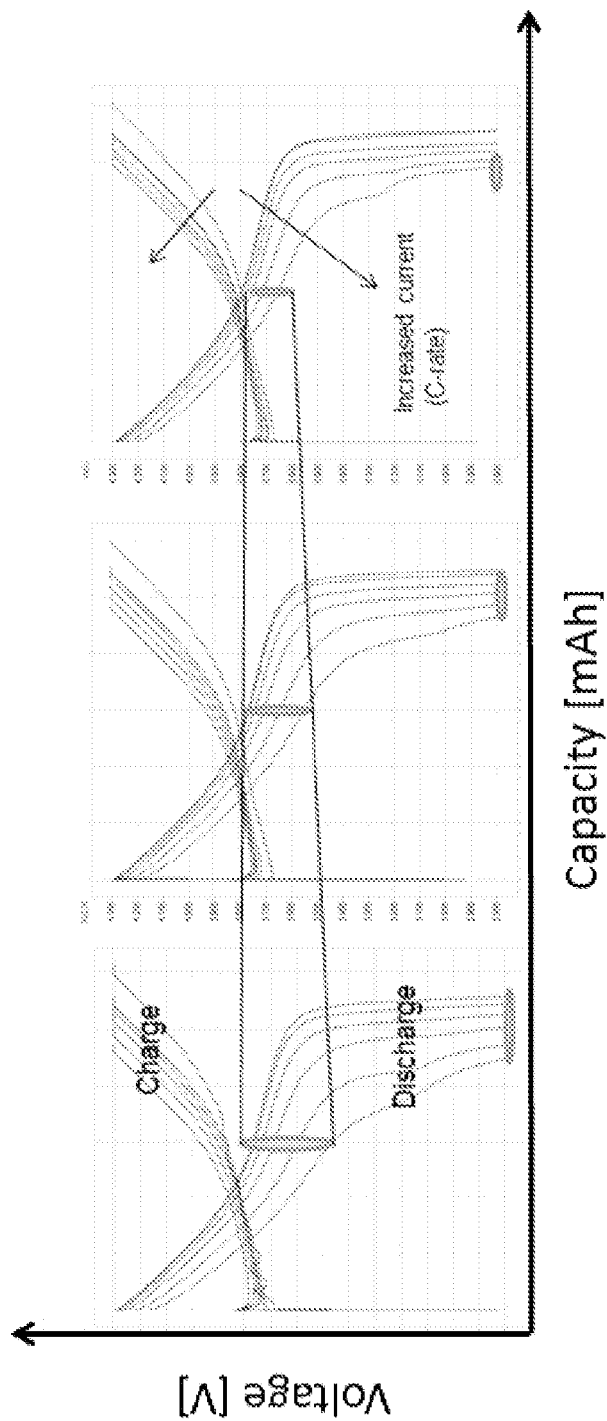

FIGS. 2A-C shows voltage profiles at 0.2, 0.5, 1, 2, 5C discharge rates of cathodes having 3 wt. % carbon black having a surface area of (2A) 54 m$^2$/g, (2B) 180 m$^2$/g, and (2C) 580 m$^2$/g. A visible net improvement is seen on the discharge curves in the 0.2 to 5C range upon progressing from FIG. 2A to FIG. 2C, with decreased polarization and capacity loss upon increasing the BET surface area of carbon black.

A larger sampling of carbon blacks with BET surface areas ranging from 54 to 770 m$^2$/g was investigated at 3 wt. % loading. The performance parameter was specific capacity at 5C discharge rate (0.5C charging rate), plotted against BET surface area of the carbon conducting additives. FIG. 1 is a plot of capacity at 5C discharge rate versus BET surface area of the carbon blacks and shows a clear percolation behavior at approximately 200 m$^2$/g. The electrical conductivity of the electrodes can be explained by the theory of percolation between two particle systems, which is expressed by the following relation:

$$\Phi_c = \left(1 + \frac{3}{4}\frac{R_i}{R_c}\right)^{-1} \quad (1)$$

where $\Phi_C$ is the critical volume fraction of conductive phase for percolation, $R_i$ is the diameter of the insulating phase particles, and $R_c$ is the diameter of conducting phase particles. Generally the weight fraction of the carbon black is fixed and the the BET specific surface area is varied by using various grades of carbon blacks. By doing so, the critical volume fraction varies because BET specific surface area and particle size are linked by the relation:

$$SA = 6/(\rho*D) \quad (2)$$

where ρ is the particle density and D is the particle diameter. This behavior could be well-fitted with a simple percolation equation:

$$C = 128 + 35*(\Phi - \Phi_C)^{0.2} \quad (3)$$

Figure 3:
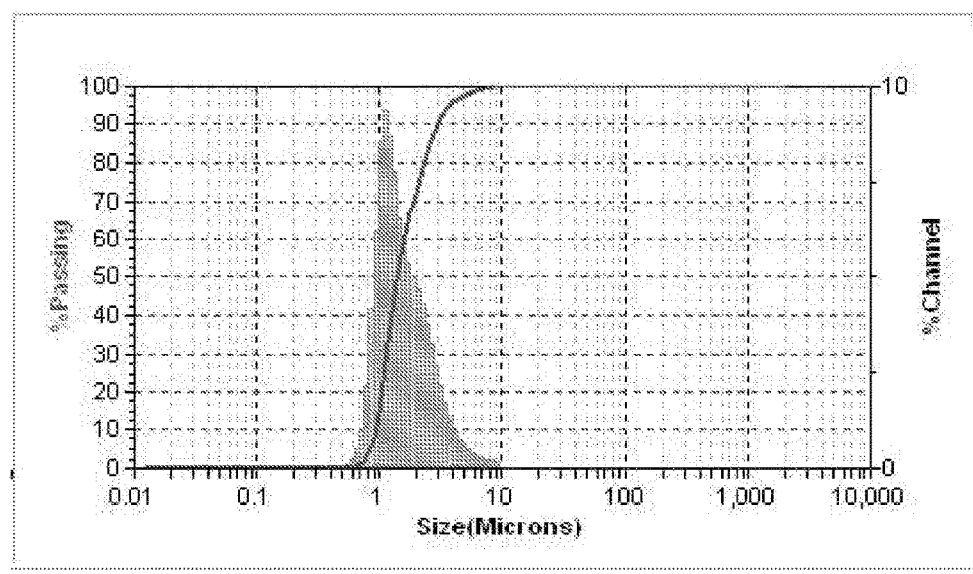
FIG. 3 shows the particle size distribution of active material of Example 2.

The 1 μm value is very close to the peak value of the particle size distribution of active material used (FIG. 3), and the Φ value of 0.01 is smaller than the true value of 0.03, indicating that all the carbon present in the electrode does not contribute to electrical percolation. This may be caused by suboptimal carbon dispersion causing some disconnected islands of carbon.

From these results, it can be seen that an optimal ratio of BET surface area of the conductive carbon additive over the active particles helps to achieve percolation. This ratio can be affected by both the weight contents and the specific surface area of the conducting carbon additive. Once this ratio is reached and electrical percolation is achieved, excess conductive carbon additive has little further benefit on performance.

Example 2

Cathode formulations were prepared as described in Example 1. The active material ("CATH") used was a powder of formula $LiNi_{0.33}Co_{0.33}Mn_{0.33}O_2$, prepared by reactive spray technology, as described in U.S. Pat. No. 6,770,226, the disclosure of which is incorporated herein by reference. The active material had a specific BET surface area of 0.7 $m^2/g$ and a medium particle size distribution of $D_{10}$=3.82 μm, $D_{50}$=5.22 μm, $D_{90}$=7.63 μm. Cathode formulations were prepared with various conductive carbon blacks having different BET surface areas, as shown in Table 2 below:

TABLE 2

| Carbon Black (CB) | BET SA | % CB | % CATH | CB/CATH | mAh/g @ 5C |
|---|---|---|---|---|---|
| CB-A (1 wt %) | 53 | 1 | 98 | 0.773 | 116.7 |
| CB-B (0.5 wt %) | 180 | 0.5 | 98.5 | 1.305 | 131.2 |
| CB-A (3 wt %) | 53 | 3 | 94 | 2.416 | 137.0 |
| CB-C (1 wt %) | 160 | 1 | 98 | 2.332 | 134.1 |
| CB-B (1 wt %) | 180 | 1 | 98 | 2.624 | 139.6 |
| CB-C (3 wt %) | 160 | 3 | 94 | 7.295 | 136.9 |
| CB-B (3 wt %) | 180 | 3 | 94 | 8.207 | 136.4 |

The carbon conductive additive loading in the electrode was normalized for BET surface area ("BET SA") and weight contents by calculating the CB/CATH ratio, which is defined as (CB wt. %×CB BET SA)/(CATH wt. %×CATH BET SA). Coin-cells (2032) were made with the electrodes and tested against Li metal anode for discharge C-rate capability, under the same conditions described in Example 1.

Figure 4:
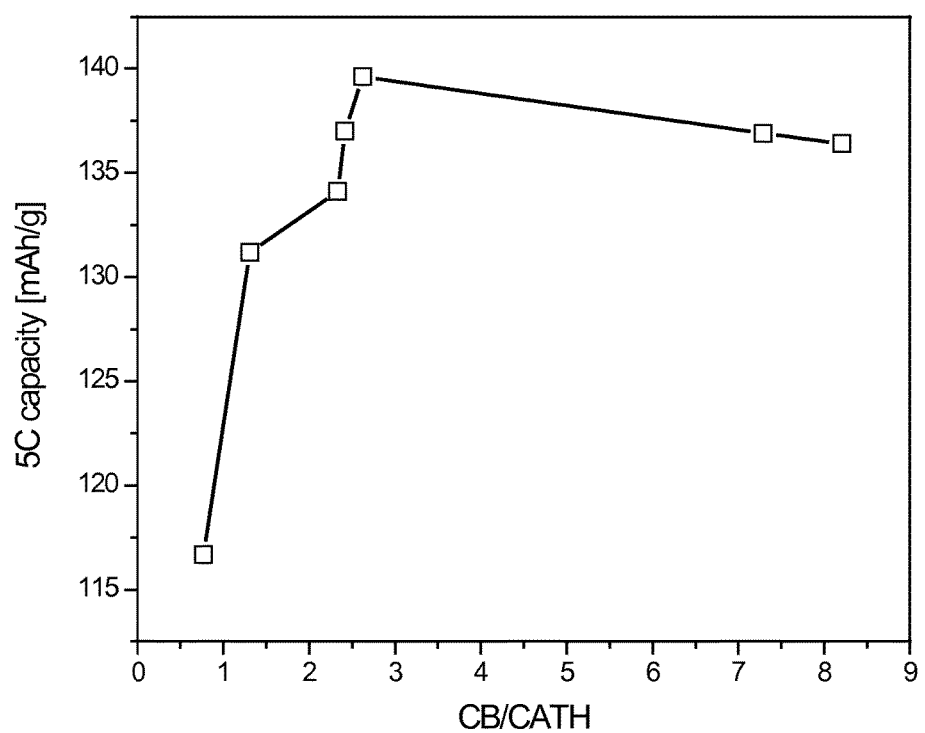
FIG. 4 is a plot of 5C capacity versus carbon black loading normalized to weight and BET surface area of the active material of Example 2.

FIG. 4 is a plot of 5C capacity versus carbon black loading normalized to weight and BET surface area of the active material, as discussed above. When plotting the 5C capacity of the electrodes versus CB/CATH ratio, a distinct percolation behavior is visible, and the maximum electrode capacity is reached at CB/CATH ratio of 3. There is little benefit, and even a slight capacity loss in increasing the CB/CATH ratio beyond this value.

Example 3

Cathode formulations were prepared according to Example 1 using a large particle size active material of formula $LiNi_{0.33}Co_{0.33}Mn_{0.33}O_2$, with a specific BET surface area of 0.27 $m^2/g$ and a particle size distribution of $D_{10}$=5.74 μm, $D_{50}$=10.93 μm, $D_{90}$=18.72 μm. Various carbon blacks were used as additives for making 1.5 $mAh/cm^2$ electrodes, the properties being listed in Table 3.

TABLE 3

| Carbon Black (CB) | BET SA | % CB | % CATH | CB/CATH | mAh/g @ 5C |
|---|---|---|---|---|---|
| CB-A (1 wt %) | 53 | 1 | 98 | 2.003 | 130.6588 |
| CB-B (0.5 wt %) | 180 | 0.5 | 98.5 | 3.384 | 130.3 |
| CB-C (1 wt %) | 160 | 1 | 98 | 6.047 | 129.1799 |
| CB-B (1 wt %) | 180 | 1 | 98 | 6.803 | 130.6588 |
| CB-D (1 wt %) | 580 | 1 | 98 | 21.92 | 127.5 |

The carbon black loading in the electrode was normalized for BET surface area and weight contents by calculating the CB/CATH ratio, as defined in Example 2. Coin-cells (2032) were made with the electrodes and tested against Li metal anode for discharge C-rate capability, under the same conditions described in Example 1.

Figure 5:
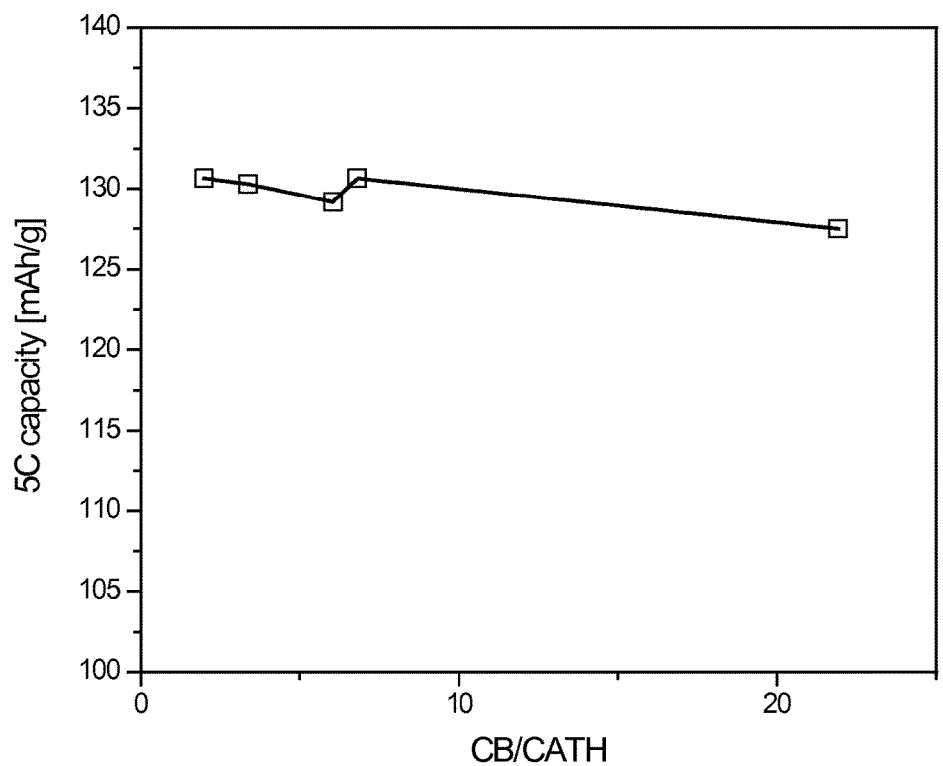
FIG. 5 is a plot of 5C capacity versus carbon black loading normalized to weight and BET surface area of the active material of Example 3.

FIG. 5 is a plot of 5C capacity versus carbon black loading normalized to weight and BET surface area of the active material, as discussed above. From FIG. 5, it can be seen that the overall 5C capacity is lower than that of cathodes having small and medium particle size active materials (Examples 1 and 2, respectively), and the trend over a wide range of CB/CATH ratios is essentially flat within experimental variations. This result indicates that electrical percolation is already achieved at the lowest CB BET surface area and 1 wt. % loading (FIG. 5), and little gain is achieved at higher CB loading and/or BET SA.

Example 4

In this example, electrodes were prepared with a mixture of active materials. Cathode powders of 80 wt. % lithium cobalt oxide (LCO) large particles (specific BET surface area of 0.20 $m^2/g$ and particle size distribution of $D_{10}$=6.02 μm, $D_{50}$=12.35 μm, $D_{90}$=22.78 μm), were blended with 20 wt. % medium sized particles of $LiNi_{0.33}Co_{0.33}Mn_{0.33}O_2$ from Example 2. Several grades of carbon blacks were used for making 3.0 $mAh/cm^2$ electrodes, as listed in Table 4 below:

TABLE 4

| Carbon black (CB) | BET SA | % CB | % CATH | CB/CATH | mAh/g @ 3C |
|---|---|---|---|---|---|
| CB-A (0.6 wt %) | 53 | 0.6 | 98.4 | 1.616 | 143.7 |
| CB-B (0.6 wt %) | 180 | 0.6 | 98.4 | 5.488 | 144.4 |
| CB-B (0.8 wt %) | 180 | 0.8 | 98.2 | 7.332 | 136.9 |
| CB-B (1.0 wt %) | 180 | 1 | 98 | 9.184 | 130.7 |
| CB-B (1.2 wt %) | 180 | 1.2 | 97.6 | 11.066 | 127.9 |
| CB-B (1.5 wt %) | 180 | 1.5 | 97 | 13.918 | 125.0 |

The carbon black loading in the electrode was normalized for BET surface area and weight contents by calculating the CB/CATH ratio, as defined in Example 2. Coin-cells (2032) were made with the electrodes and tested against Li metal anode for discharge C-rate capability, under the same conditions described in Example 1.

Figure 6:
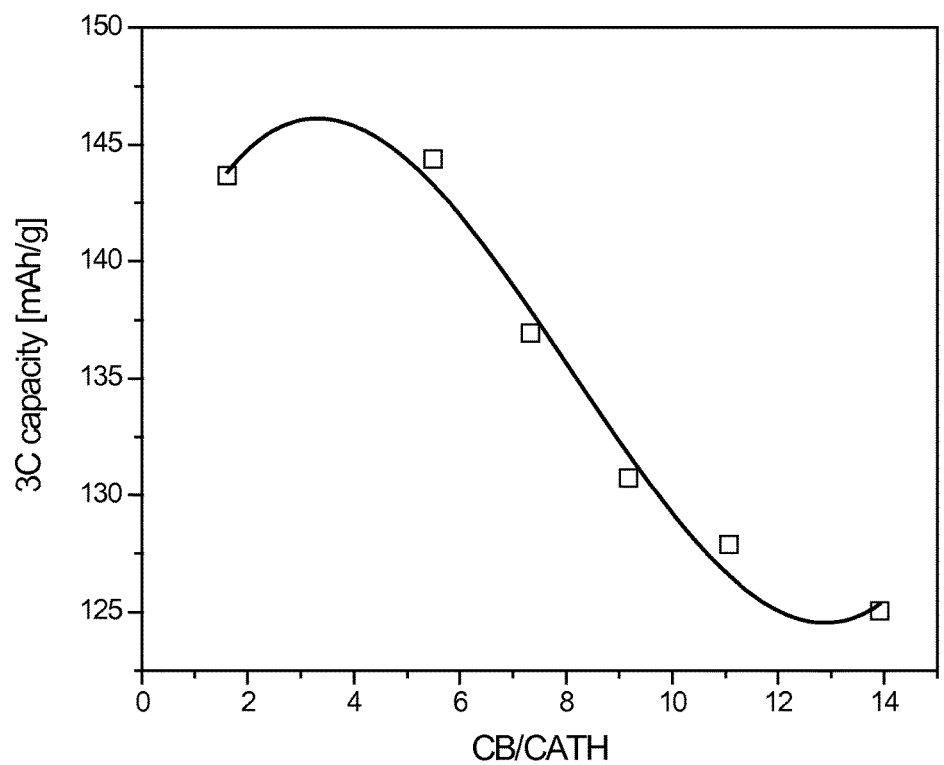
FIG. 6 is a plot of 3C capacity versus carbon black loading normalized to weight and BET surface area of the active material of Example 4.

FIG. 6 is a plot of 3C capacity versus carbon black loading normalized to weight and BET surface area of the active material, as discussed above. When plotting the 3C capacity of the electrodes versus CB/CATH ratio, there appears to be an optimum of the capacity at CB/CATH ratio of 3 as in Example 2. However, there is a clear trend of capacity decay at higher CB/CATH ratios. This can be understood in light of the fact that the electrodes in this study are twice as thick as in the previous examples.

Figures 7A, 7B:
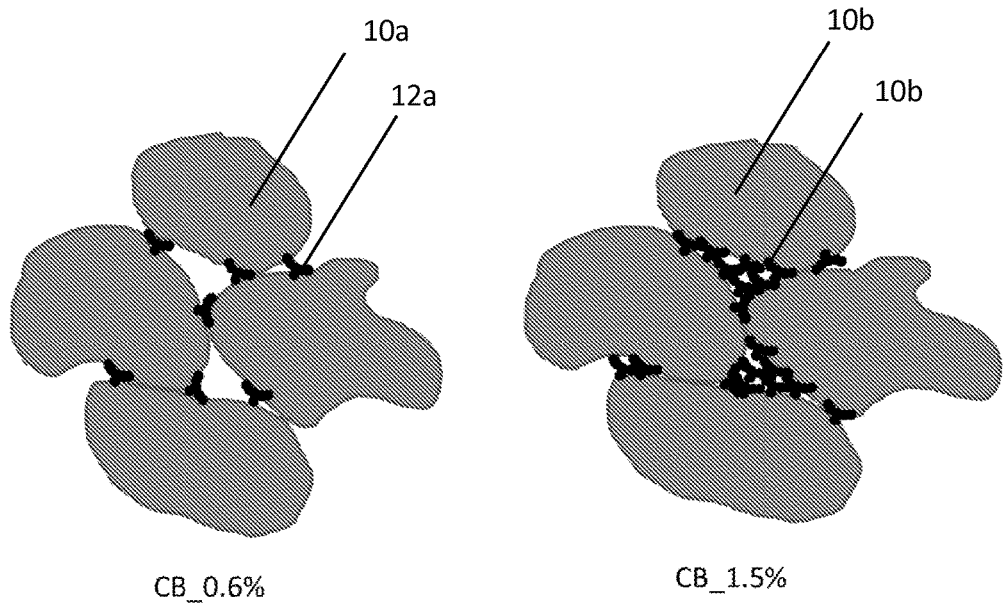
FIGS. 7A and 7B schematically illustrate cathode materials comprising carbon black particles interspersed within particles of active material for carbon black loadings of 0.6 wt % (FIG. 7A) and 1.5 wt % (FIG. 7B).

Performance is not entirely dominated by electronic conductivity; Li diffusion in the electrode layer also plays a significant role. FIGS. 7A and 7B schematically illustrate cathode materials comprising carbon black particles 12a and 12b, respectively, interspersed within particles of active material 10a and 10b, respectively, where the carbon black loading in FIG. 7A (0.6 wt %) is less than that of FIG. 7B (1.5 wt %). Due to the higher carbon black loading in the material of FIG. 7B, there is greater occupation of voids existing between the relatively larger active material particles 10b. As a consequence, Li diffusion through the electrode porosity is impeded to a greater extent in FIG. 7, and electrode capacity at high rates of discharge is reduced.

The use of the terms "a" and "an" and "the" are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

The invention claimed is:

1. A cathode formulation comprising:
    a lithium ion-based electroactive material; and
    carbon black having a Brunauer-Emmett-Teller (BET) surface area ranging from 130 to 700 $m^2/g$, a ratio of statistical thickness surface area (STSA)/BET ranging from 0.5 to 1, and a surface energy less than or equal to 10 $mJ/m^2$,
    wherein the carbon black has a crystallinity ($I_G/I_D$) of at least 35%, as determined by Raman spectroscopy.

2. The cathode formulation of claim 1, wherein the carbon black has an oil absorption number (OAN) ranging from 100 to 250 mL/100 g.

3. The cathode formulation of claim 1, wherein the carbon black is present in an amount ranging from 0.1% to 10% by weight, relative to the total weight of the formulation.

4. The cathode formulation of claim 1, wherein the lithium ion-based electroactive material has a $D_{50}$ ranging from 1 μm to 10 μm.

5. The cathode formulation of claim 1, wherein the lithium ion-based electroactive material is present in the cathode formulation in an amount of at least 80% by weight, relative to the total weight of the cathode formulation.

6. The cathode formulation of claim 1, wherein the carbon black is present in the cathode formulation in an amount ranging from 3% to 10% by weight, relative to the total weight of the cathode formulation.

7. The cathode formulation of claim 1, wherein the lithium ion-based electroactive material is selected from:
    LiMPO$_4$, wherein M represents one or more metals selected from Fe, Mn, Co, and Ni;
    LiM'O$_2$, wherein M' represents one or more metals selected from Ni, Mn, Co, Al, Mg, Ti, V, Cr, Fe, Zr, Ga, and Si;
    Li(M")$_2$O$_4$, wherein M" represents one or more metals selected from Ni, Mn, Co, Al, Mg, Ti, V, Cr, Fe, Zr, Ga, and Si; and
    Li$_{1+x}$(Ni$_y$Co$_{1-y-z}$Mn$_z$)1-$_x$O$_2$, wherein x ranges from 0 to 1, y ranges from 0 to 1 and z ranges from 0 to 1.

8. The cathode formulation of claim 1, wherein the lithium ion-based electroactive material is selected from at least one of LiNiO$_2$; LiNi$_x$Al$_y$O$_2$ where x varies from 0.8-0.99, y varies from 0.01-0.2, and x+y=1; LiCoO$_2$; LiMn$_2$O$_4$; Li$_2$MnO$_3$; LiNi$_{0.5}$Mn$_{1.5}$O$_4$; LiFe$_x$Mn$_y$Co$_z$PO$_4$ where x varies from 0.01-1, y varies from 0.01-1, z varies from 0.01-0.2, and x+y+z=1; LiNi$_{1-x-y}$Mn$_x$Co$_y$O$_2$, wherein x ranges from 0.01 to 0.99 and y ranges from 0.01 to 0.99; and layer-layer compositions containing an Li$_2$MnO$_3$ phase or a LiMn$_2$O$_3$ phase.

9. The cathode formulation of claim 1, wherein the lithium ion-based electroactive material is selected from at least one of Li$_2$MnO$_3$; LiNi$_{1-x-y}$Mn$_x$Co$_y$O$_2$ wherein x ranges from 0.01 to 0.99 and y ranges from 0.01 to 0.99; LiNi$_{0.5}$Mn$_{1.5}$O$_4$; Li$_{1+x}$(Ni$_y$Co$_{1-y-z}$Mn$_z$)$_{1-x}$O$_2$, wherein x ranges from 0 to 1, y ranges from 0 to 1 and z ranges from 0 to 1; and layer-layer compositions containing at least one of an Li$_2$MnO$_3$ phase and an LiMn$_2$O$_3$ phase.

10. The cathode formulation of claim 1, wherein the carbon black is homogeneously interspersed with the lithium-ion based electroactive material.

11. The cathode formulation of claim 1, wherein the surface area ratio of carbon black to lithium ion-based electroactive material ranges from 1 to 5.

12. A cathode paste containing particles comprising a lithium ion-based electroactive material and a carbon black, wherein the paste further comprises:
    a binder; and
    a solvent,
    wherein the carbon black has a Brunauer-Emmett-Teller (BET) surface area ranging from 130 to 700 $m^2/g$, a ratio of statistical thickness surface area (STSA)/BET ranging from 0.5 to 1, and a surface energy less than or equal to 10 $mJ/m^2$, wherein the carbon black has a crystallinity ($I_G/I_D$) of at least 35% as determined by Raman spectroscopy.

13. A method of making a cathode, comprising:
    combining particles comprising carbon black, a lithium ion-based electroactive material, and a binder in the presence of a solvent to produce a paste;
    depositing the paste onto a substrate; and
    forming the cathode,
    wherein the carbon black has a Brunauer-Emmett-Teller (BET) surface area ranging from 130 to 700 $m^2/g$, a ratio of statistical thickness surface area (STSA)/BET ranging from 0.5 to 1, and a surface energy less than or equal to 10 $mJ/m^2$, wherein the carbon black has a crystallinity ($I_G/I_D$) of at least 35% as determined by Raman spectroscopy.

14. The method of claim 13, wherein the forming comprises removing the solvent.

* * * * *